United States Patent
Edamitsu

(10) Patent No.: US 10,345,502 B2
(45) Date of Patent: Jul. 9, 2019

(54) PLANAR ILLUMINATION APPARATUS WITH LIGHT GUIDE PLATE HAVING A CUTOUT

(71) Applicant: MINEBEA MITSUMI Inc., Nagano (JP)

(72) Inventor: Takashi Edamitsu, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 95 days.

(21) Appl. No.: 15/644,972

(22) Filed: Jul. 10, 2017

(65) Prior Publication Data

US 2018/0017728 A1 Jan. 18, 2018

(30) Foreign Application Priority Data

Jul. 14, 2016 (JP) .................................. 2016-139772
Apr. 13, 2017 (JP) .................................. 2017-080028

(51) Int. Cl.
*F21V 8/00* (2006.01)
*G09G 3/34* (2006.01)

(52) U.S. Cl.
CPC ......... *G02B 6/0021* (2013.01); *G02B 6/0068* (2013.01); *G09G 3/342* (2013.01); *G09G 3/3406* (2013.01); *G02B 6/0073* (2013.01); *G02B 6/0091* (2013.01); *G09G 2320/0233* (2013.01)

(58) Field of Classification Search
CPC .... G02B 6/002; G02B 6/0021; G02B 6/0068; G02B 6/0073; G02B 6/0091
See application file for complete search history.

(56) References Cited

U.S. PATENT DOCUMENTS

| 7,360,937 B2* | 4/2008 | Han | G02B 6/0026 |
| | | | 257/E33.073 |
| 7,484,875 B2* | 2/2009 | Kim | G02B 6/0016 |
| | | | 362/612 |
| 9,304,247 B2* | 4/2016 | Yeo | G02B 6/002 |

(Continued)

FOREIGN PATENT DOCUMENTS

| JP | 2002-196151 A | 7/2002 |
| JP | 2007-115697 A | 5/2007 |

(Continued)

OTHER PUBLICATIONS

Notification of Reasons for Refusal dated Aug. 3, 2018 for corresponding Japanese Application No. 2017-080028.

*Primary Examiner* — Alan B Cariaso
(74) *Attorney, Agent, or Firm* — Pearne & Gordon LLP

(57) ABSTRACT

A planar illumination apparatus includes: a plurality of light sources that are disposed linearly and that emit light; and a light guide plate that has a lateral surface on which the light sources are disposed so as to face the lateral surface and includes extended portions each extending in directions in which the extended portions are spaced away from each other from both ends of the lateral surface and are away from the light sources. The light guide plate has a light emitting region that is either in contact with a boundary or disposed on a side opposite to one of the extended portions with respect to the boundary, in which the boundary is established between an emission range of an end portion light source on a side adjacent to the extended portion and a region different from the emission range.

9 Claims, 8 Drawing Sheets

(56) References Cited

U.S. PATENT DOCUMENTS

| | | | |
|---|---|---|---|
| 2007/0091640 A1 | 4/2007 | Kim et al. | |
| 2007/0177405 A1* | 8/2007 | Chan | G02B 6/002 362/613 |
| 2014/0146566 A1* | 5/2014 | Zheng | G02B 6/0023 362/608 |

FOREIGN PATENT DOCUMENTS

| | | |
|---|---|---|
| JP | 2008-103087 A | 5/2008 |
| JP | 2008-298905 A | 12/2008 |
| JP | 2012-104506 A | 5/2012 |
| JP | 2013-211184 A | 10/2013 |

* cited by examiner

FIG.1
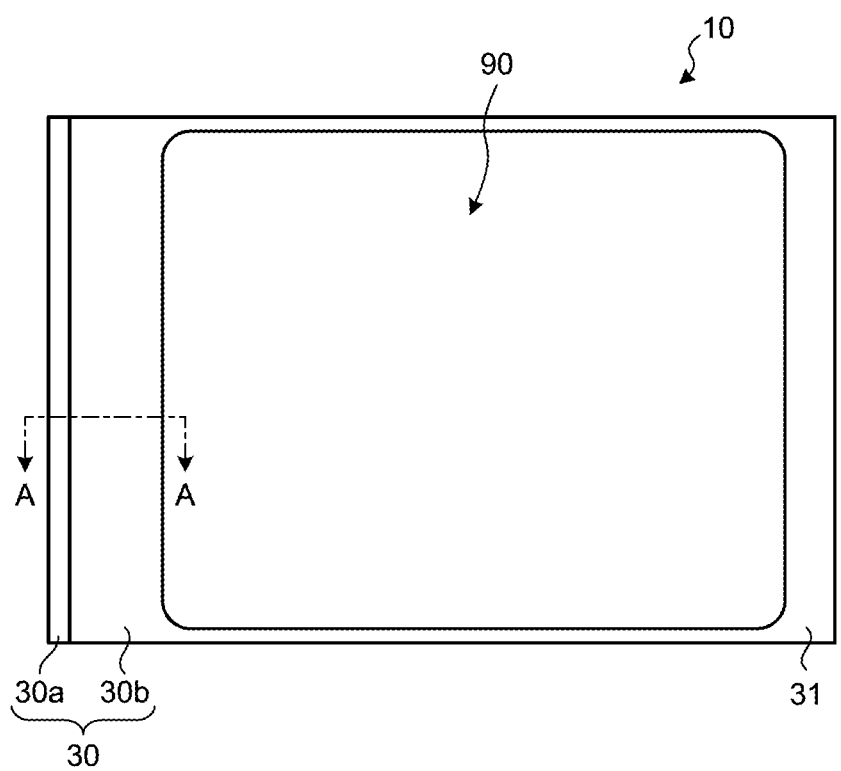
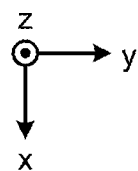

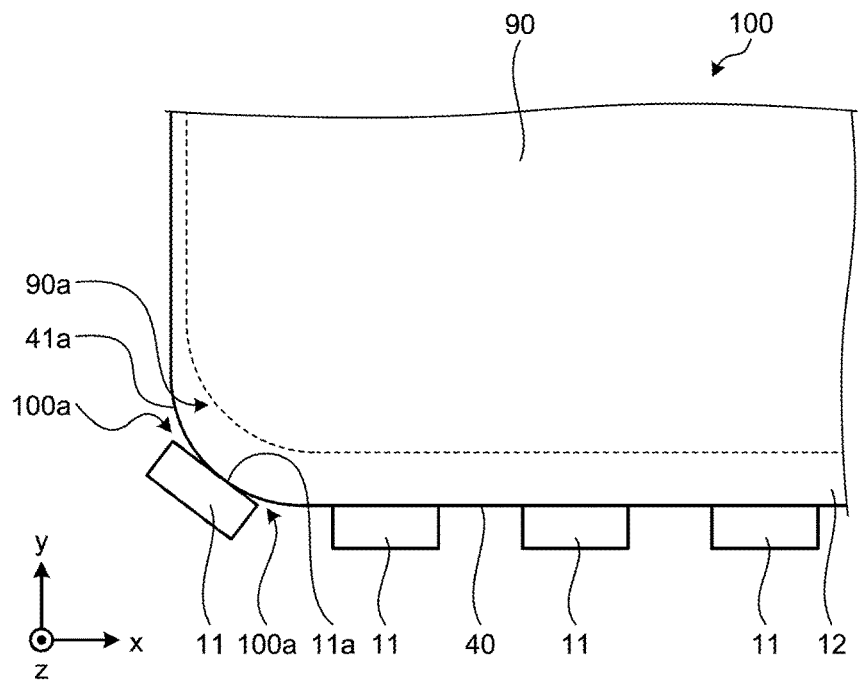
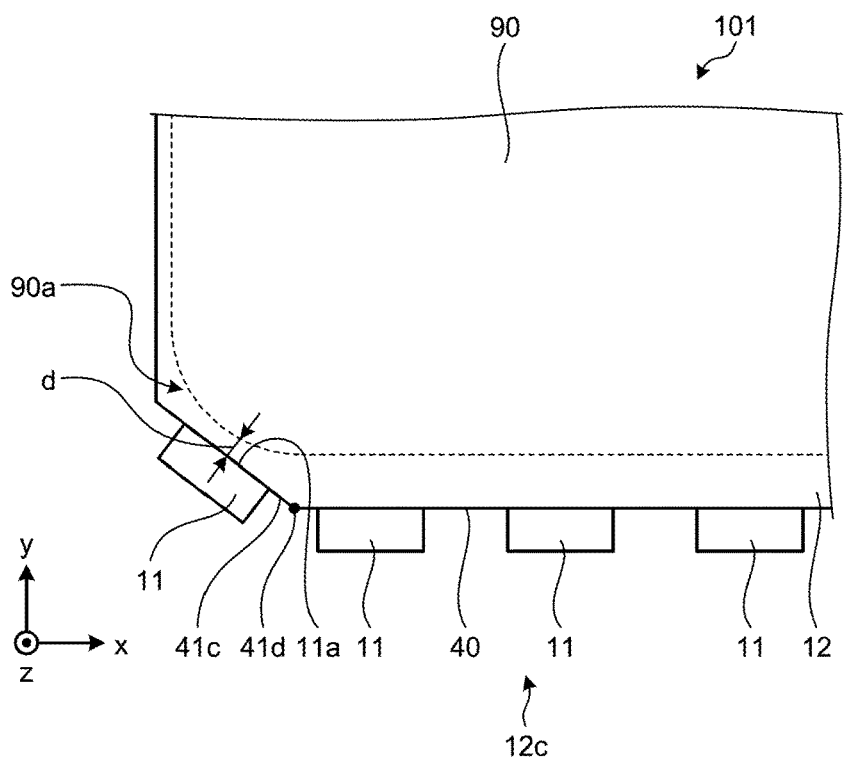

PLANAR ILLUMINATION APPARATUS WITH LIGHT GUIDE PLATE HAVING A CUTOUT

CROSS-REFERENCE TO RELATED APPLICATION(S)

The present application claims priority to and incorporates by reference the entire contents of Japanese Patent Application No. 2016-139772 filed in Japan on Jul. 14, 2016; and Japanese Patent Application No. 2017-080028 filed in Japan on Apr. 13, 2017.

BACKGROUND OF THE INVENTION

1. Field of the Invention

The present invention relates to a planar illumination apparatus.

2. Description of the Related Art

A known planar illumination apparatus includes a light guide plate that emits light incident on a light incident surface from a light emitting diode (LED) (see, for example, Japanese Patent Application Laid-open No. 2008-298905).

In the planar illumination apparatus mentioned above, the light guide plate may have at least two corners on a side along which LEDs 11 are disposed, out of the four corners of a rectangle, cut out from, for example, a design property viewpoint including an illuminated object. If, for example, the cutout portion has a curved surface and the LEDs are disposed so as to face the respective curved surfaces, a gap is produced between the LED and the curved surface, resulting at times in uneven luminance.

SUMMARY OF THE INVENTION

A planar illumination apparatus according to one embodiment of the present invention includes a plurality of light sources that are disposed linearly and that emit light, and a light guide plate that has a lateral surface on which the light sources are disposed so as to face the lateral surface and includes extended portions each extending in directions in which the extended portions are spaced away from each other from both ends of the lateral surface and are away from the light sources. The light guide plate has a light emitting region that is either in contact with a boundary or disposed on a side opposite to one of the extended portions with respect to the boundary, in which the boundary is established between an emission range of an end portion light source on a side adjacent to the extended portion and a region different from the emission range.

BRIEF DESCRIPTION OF THE DRAWINGS

FIG. 1 is a front elevational view of an exemplary appearance of a planar illumination apparatus according to an embodiment;

FIG. 6 is a top view illustrating a positional relation among a light guide plate, a light emitting area, and an end portion LED in a planar illumination apparatus according to a first comparative example;

FIG. 7 is a top view illustrating a positional relation among a light guide plate, a light emitting area, and an end portion LED in a planar illumination apparatus according to a second comparative example;

DETAILED DESCRIPTION OF THE PREFERRED EMBODIMENTS

Figure 2:
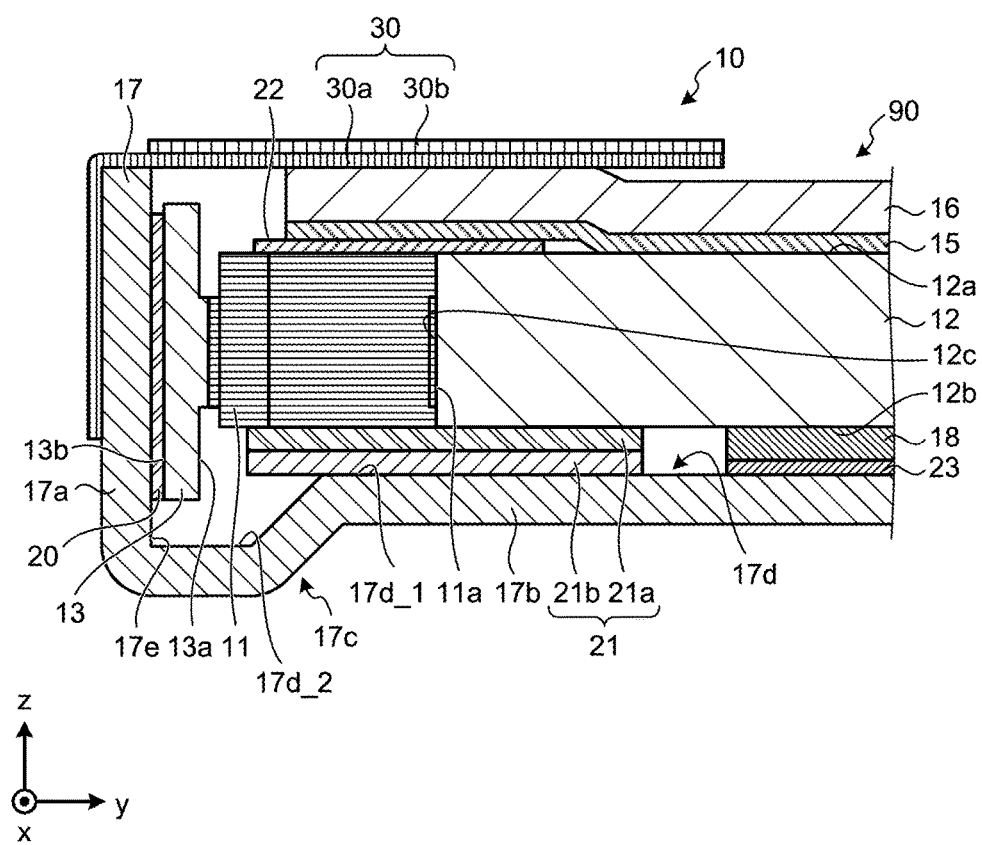
FIG. 2 is a sectional view taken along line A-A in FIG. 1.

The following describes, with reference to the accompanying drawings, a planar illumination apparatus according to an embodiment. It is noted that scaling of elements in the drawings does not necessarily represent precise dimensions of the various elements illustrated therein. It should also be noted that some portions in one drawing may be illustrated in another drawing at different scales from each other.

Embodiment

FIG. 1 is a front elevational view of an exemplary appearance of a planar illumination apparatus according to an embodiment. As illustrated in FIG. 1, this planar illumination apparatus 10 according to the embodiment has a substantially rectangular shape in a top view. The planar illumination apparatus 10 has a first end side in a longitudinal direction (Y-axis direction) covered in a light shielding sheet 30 that includes a first light shielding sheet 30a and a second light shielding sheet 30b. The planar illumination apparatus 10 has a second end side in the longitudinal direction covered in a light shielding sheet 31. The light shielding sheet 30 and the light shielding sheet 31 are integrally molded with each other. Additionally, the planar illumination apparatus 10 has a light emitting region (also referred to as a light emitting area) 90 that is not covered in the light shielding sheet 30 or the light shielding sheet 31. The light emitting region 90 emits light. Specifically, the light shielding sheets 30 and 31 define the light emitting region 90. The planar illumination apparatus 10 according to the embodiment is applied as a backlight in a liquid crystal display apparatus. Such a liquid crystal display apparatus is included, for example, in a smartphone.

In FIG. 1, it is noted that the light shielding sheet 30 has a width wider than a width of the light shielding sheet 31. This is because of the following reason. Specifically, while the light shielding sheet 31 covers a light guide plate 12, a diffusion sheet 15, and a prism sheet 16 disposed below the light shielding sheet 31, the light shielding sheet 30 covers a relatively wide region including an LED 11 and an FPC 13, in addition to the light guide plate 12, the diffusion sheet 15, and the prism sheet 16 disposed below the light shielding sheet 30. The light guide plate 12, the diffusion sheet 15, the prism sheet 16, the LED 11, and the FPC 13 will be described later.

FIG. 2 is a sectional view taken along line A-A in FIG. 1. As illustrated in FIG. 2, the planar illumination apparatus 10 includes the LED 11, the light guide plate 12, the FPC 13, the diffusion sheet 15, the prism sheet 16, a frame 17, a reflective sheet 18, a fixing member 20, a first coupling member 21, a second coupling member 22, a double-sided tape 23, and the light shielding sheet 30.

The FPC 13 is a strip-shaped substrate extending in a lateral direction (x-axis direction; a long side direction of a light incident surface 12c to be described later) of the planar illumination apparatus 10. The FPC 13 has two main surfaces 13a and 13b. The two main surfaces 13a and 13b are each a strip-shaped surface extending in the lateral direction of the planar illumination apparatus 10. The main surface 13a out of the two main surfaces 13a and 13b serves as a mounting surface on which the LED 11 is mounted. Thus, the main surface 13a may be denoted as a "mounting surface 13a". The LED 11 has a surface opposite to a light emitting surface 11a mounted on the mounting surface 13a. The LED 11 is driven to emit light through control by a drive circuit not illustrated via the FPC 13.

The light guide plate 12 is formed of a transparent material (e.g., a polycarbonate resin) into a rectangular shape in a top view. The light guide plate 12 has main surfaces 12a and 12b, and a lateral surface (end face) 12c. The lateral surface 12c is a light incident surface on a side on which the LED 11 is disposed. This light incident surface is formed into a strip shape extending in the lateral direction of the planar illumination apparatus 10. Thus, in the following, the "lateral surface 12c" may be denoted as the "light incident surface 12c". Light emitted by the LED 11 is incident on the light incident surface 12c. Specifically, the light incident surface 12c receives the light emitted by the LED 11 and incident thereon. Of the two main surfaces 12a and 12b, the main surface 12a is an emission surface from which the light incident on the light incident surface 12c (light emitted by the LED 11) is emitted. Thus, in the following, the "main surface 12a" may be referred to as an "emission surface 12a". A light path changing pattern that may, for example, include a plurality of dots is formed on the side of the main surface 12b opposite to the emission surface 12a of the light guide plate 12. The light path changing pattern formed on the main surface 12b changes a direction in which light passing through the light guide plate 12 travels, so that the light is emitted from the emission surface 12a. Specifically, the planar illumination apparatus 10 in the embodiment is what is called an edge light type illumination apparatus. It is noted that, in the planar illumination apparatus 10, light is emitted from the light emitting region 90 out of the emission surface 12a. Specifically, the light emitting region 90 emits light that is incident on the light incident surface 12c.

The LED 11 is a point-like light source. The LED 11 is, for example, a pseudo-white LED formed of a blue LED and a yellow fluorescent material. The LED 11 is what is called a top-view type LED formed substantially into a rectangular parallelepiped shape as a whole. The LED 11 has the light emitting surface 11a and a surface opposite to the light emitting surface 11a. The surface opposite to the light emitting surface 11a is mounted on the mounting surface 13a of the FPC 13. The LED 11 is provided in plurality. The LEDs 11 are mounted on the mounting surface 13a at predetermined spaced intervals along a long side direction (x-axis direction) of the mounting surface 13a. This results in the LEDs 11 being disposed at predetermined spaced intervals along the long side direction of the light incident surface 12c (x-axis direction) under a condition in which the LEDs 11 have the light emitting surfaces 11a facing the light incident surface 12c of the light guide plate 12. It is noted that the LEDs 11 are disposed linearly along a flat lateral surface 40 to be described later of the light incident surface 12c. This will be described later. It is further noted that the LED 11 may be a side-view type LED. It is needless to say that embodiment is not limited to a case in which the plurality of LEDs 11 are individually separated. The plurality of LEDs 11 may be a form in which the plurality of LEDs 11 are integrated so that there is no gap between adjacent ones of the plurality of LEDs 11, for example.

The frame 17 houses therein the LEDs 11, the light guide plate 12, the FPC 13, the diffusion sheet 15, the prism sheet 16, the reflective sheet 18, the fixing member 20, the first coupling member 21, the second coupling member 22, and the double-sided tape 23. The frame 17 may be, for example, a stainless steel sheet-metal frame having high stiffness and a high light reflection factor. The frame 17 includes a lateral wall 17a and a bottom portion 17b.

The bottom portion 17b has a shape expanding along the main surface 12b of the light guide plate 12. The bottom portion 17b has a floor surface 17d, which is a surface thereof on the side adjacent to the light guide plate 12. The floor surface 17d has a flat surface 17d_1 and a concave surface 17d_2 of a recess 17c to be described later. The light guide plate 12 and the LEDs 11 are placed on the flat surface 17d_1. The lateral wall 17a rises integrally with, and from, the bottom portion 17b along the long side direction of the light incident surface 12c of the light guide plate 12 in a direction in which light is emitted (a direction normal to the flat surface 17d_1 of the floor surface 17d; a plus direction of the z-axis). The lateral wall 17a has a lateral surface 17e, which is an inner surface thereof. Additionally, the bottom portion 17b has the recess 17c. The recess 17c is formed so as to be recessed in a direction opposite to a direction in which light is emitted along the lateral surface 17e from a portion of the floor surface 17d on a side adjacent to the lateral surface 17e (specifically, a minus direction of the z-axis). The recess 17c allows a lower end portion of the FPC 13 to escape. The recess 17c is formed to have a width that allows the larger first coupling member 21 to be disposed on the flat surface 17d_1 of the floor surface 17d. The recess 17c has the concave surface 17d_2.

The reflective sheet 18 reflects light that has leaked from the main surface 12b opposite to the emission surface 12a and returns the light to the light guide plate 12. The reflective sheet 18 is disposed between the main surface 12b of the light guide plate 12 and the floor surface 17d under a condition in which the reflective sheet 18 is fixed on the floor surface 17d (specifically, the flat surface 17d_1 of the floor surface 17d) by the double-sided tape 23.

The double-sided tape 23 is, for example, white in color. The double-sided tape 23 has a first surface affixed to part of the reflective sheet 18 and a second surface affixed to the floor surface 17d (specifically, the flat surface 17d_1 of the floor surface 17d). The foregoing affixing results in the double-sided tape 23 fixing the reflective sheet 18 to the floor surface 17d.

The fixing member 20 fixes the FPC 13 onto the lateral surface 17e of the frame 17. The fixing member 20 may be, for example, a double-sided tape. The fixing member 20 has a first surface affixed to the main surface 13b of the FPC 13 and a second surface affixed to the lateral surface 17e. The foregoing affixing results in the FPC 13 being fixed to the lateral surface 17e.

The first coupling member 21 is disposed between the light guide plate 12 and the LED 11, and the floor surface 17d (specifically, the flat surface 17d_1 of the floor surface 17d), thus optically or structurally coupling the light guide plate 12 to the LED 11. To cite a specific example for illustration, the first coupling member 21 couples the light incident surface 12c of the light guide plate 12 to the light emitting surface 11a of the LED 11 under a condition in which an optical axis of the light guide plate 12 is aligned with an optical axis of the LED 11. The first coupling member 21 is a strip-shaped single-sided tape including an adhesive layer (adhesive) 21a and a substrate 21b.

The substrate 21b is, for example, PET and the adhesive layer 21a is, for example, silicone or acryl. The adhesive layer 21a adheres to at least part of the main surface 12b of the light guide plate 12 on the side closer to the LED 11 and adheres to at least part of the surface of the LED 11 on the side of the floor surface 17d closer to the light guide plate 12. This adhering results in at least part of the main surface 12b of the light guide plate 12 and at least part of the surface of the LED 11 on the side of the floor surface 17d being mounted on the first coupling member 21. As a result, the first coupling member 21 couples the light incident surface 12c of the first coupling member 21 to the light emitting surface 11a of the LED 11.

Consider a hypothetical case in which the first coupling member 21 is a double-sided tape. The following describes this hypothetical case. In this case, the light guide plate 12 and the LED 11 are fixed to the floor surface 17d. Thus, when an external force is applied to the planar illumination apparatus 10, the light guide plate 12 and the LED 11 are unable to release the external force and may be damaged. The first coupling member 21 in the embodiment, however, is a single-sided tape, and thus the light guide plate 12 and the LED 11 are not fixed to the floor surface 17d, so that the light guide plate 12 and the LED 11 can release the external force. Thus, in the planar illumination apparatus 10 in the embodiment, the light guide plate 12 and the LED 11 can be prevented from being damaged.

The first coupling member 21 includes a material that absorbs or reflects light. The first coupling member 21, for example when including a material that reflects light, reflects light emitted from the light emitting surface 11a of the LED 11 to thereby return the light to the light guide plate 12. This feature can enhance luminance.

The second coupling member 22 is disposed, with respect to the light guide plate 12 and the LED 11, on the side opposite to the first coupling member 21 and optically or structurally couples the light guide plate 12 to the LED 11. To cite a specific example for illustration, the light incident surface 12c of the light guide plate 12 is coupled to the light emitting surface 11a of the LED 11. The second coupling member 22 is disposed between the diffusion sheet 15 to be described later, and the light guide plate 12 and the LED 11. The second coupling member 22 is, for example, a double-sided tape. The second coupling member 22 has a first surface affixed to at least part of the emission surface 12a of the light guide plate 12 closer to the LED 11, and affixed to at least part of a surface of the LED 11 opposite to a surface on the floor surface 17d side and closer to the light guide plate 12. The foregoing affixing results in at least part of the emission surface 12a of the light guide plate 12 and at least part of the surface of the LED 11 opposite to the surface on the floor surface 17d side being mounted on the second coupling member 22. As a result, the second coupling member 22 couples the light incident surface 12c of the light guide plate 12 to the light emitting surface 11a of the LED 11.

Additionally, the second coupling member 22 has a second surface affixed to at least part of the diffusion sheet 15 on the lateral wall 17a side. This affixing results in the second coupling member 22 fixing the diffusion sheet 15 to the light guide plate 12 and the LED 11. This enables the second coupling member 22 to prevent the diffusion sheet 15 from being separated from the light guide plate 12 and prevent luminance and a luminance characteristic such as luminance distribution of light emitted from the light emitting region 90 from being degraded.

The diffusion sheet 15 is disposed on the side of the emission surface 12a of the light guide plate 12 and diffuses light emitted from the emission surface 12a. To cite a specific example for illustration, the diffusion sheet 15 is disposed so as to cover at least part of surfaces of the emission surface 12a and the LED 11 opposite to surfaces of the emission surface 12a and the LED 11 on the floor surface 17d side and diffuses light emitted from the emission surface 12a. As described previously, the diffusion sheet 15 is fixed to the light guide plate 12 and the LED 11 by the second coupling member 22.

The prism sheet 16 is disposed on a surface of the diffusion sheet 15 opposite to a surface of the diffusion sheet 15 facing the emission surface 12a. The prism sheet 16 performs distribution control for light diffused by the diffusion sheet 15 and emits the light that has undergone the distribution control.

The light shielding sheet 30 is disposed so as to cover part of the prism sheet 16 on the side of the lateral wall 17a. The light shielding sheet 30 shields light emitted from a partial region of the emission surface 12a of the light guide plate 12.

The light shielding sheet 30 includes the first light shielding sheet 30a and the second light shielding sheet 30b. The first light shielding sheet 30a is, for example, a single-sided tape capable of shielding light. The first light shielding sheet 30a has a first end side affixed to an outside surface of the lateral wall 17a of the frame 17. The first light shielding sheet 30a has a second end side affixed to the side of the lateral wall 17a of the prism sheet 16. Additionally, the second light shielding sheet 30b is, for example, a double-sided tape capable of shielding light. The second light shielding sheet 30b has two main surfaces. The second light shielding sheet 30b has a first main surface out of the two main surfaces affixed to the second end side of the first light shielding sheet 30a and a second main surface out of the two main surfaces affixed to a liquid crystal display apparatus that incorporates the planar illumination apparatus 10 for a backlight thereof.

Figure 3:
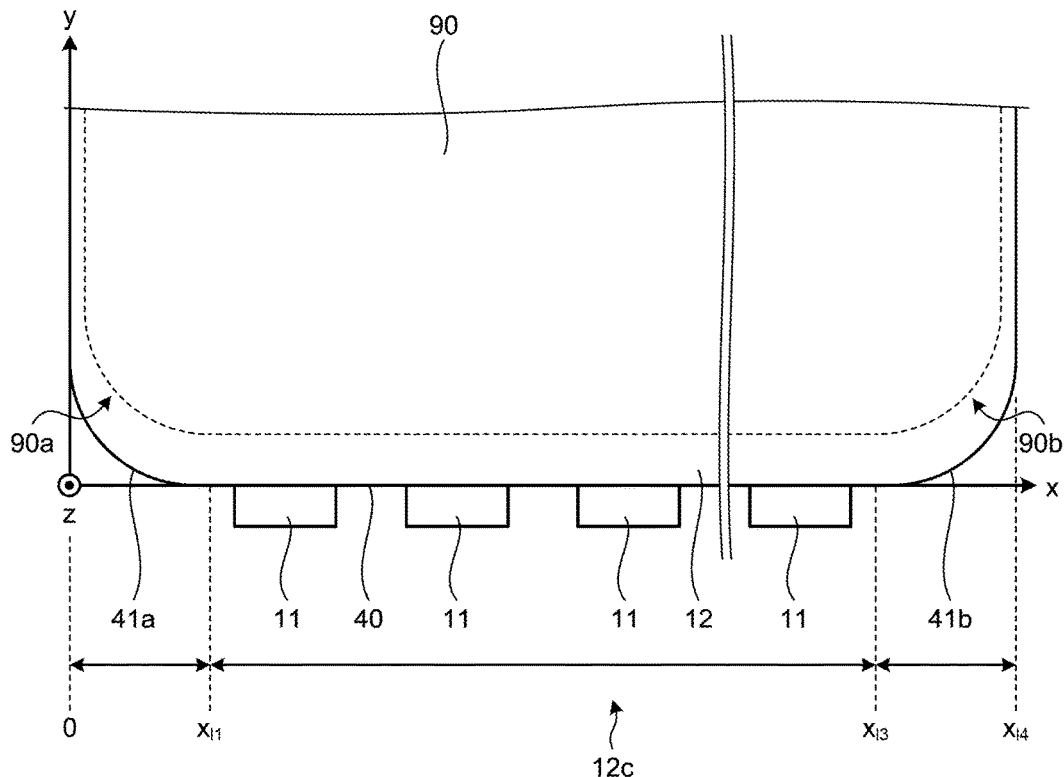
FIG. 3 is a top view of a light incident surface and a plurality of LEDs in the embodiment.

The following describes, with reference to FIG. 3, an exemplary layout of the LEDs 11 with respect to the light incident surface 12c according to the embodiment. FIG. 3 is a top view of the light incident surface and the LEDs in the embodiment. As illustrated in the example of FIG. 3, the light incident surface 12c has the lateral surface 40 and further includes extended portions 41a and 41b. Specifically, the lateral surface 40 is formed on a first lateral surface of the light guide plate 12. The extended portion 41a is formed on a first end side in the x-axis direction of the lateral surface 40 and the extended portion 41b is formed on a second end side in the x-axis direction of the lateral surface 40. In the example illustrated in FIG. 3, in the light incident surface 12c, the extended portion 41a is represented by a surface of a range extending in the x-axis direction from an x-coordinate equal to or greater than "0" to an x-coordinate smaller than "$x_{l1}$", the lateral surface 40 is represented by a surface of a range extending in the x-axis direction from the x-coordinate equal to or greater than "$x_{l1}$" to an x-coordinate equal to or smaller than "$x_{l3}$", and the extended portion 41b is represented by a surface of a range extending in the x-axis direction from the x-coordinate greater than "$x_{l3}$" to an x-coordinate equal to or smaller than "$x_{l4}$".

Additionally, as illustrated in FIG. 3, the light guide plate 12 has the above-mentioned light emitting region 90. The light emitting region 90 has a substantially rectangular shape including at least two rounded corners 90a and 90b formed on the side of the light incident surface 12c. The corner 90a is formed at a position corresponding to the extended portion 41a. The corner 90b is formed at a position corresponding to the extended portion 41b.

The lateral surface 40 is flat. Specifically, the lateral surface 40 has a flat surface. In the embodiment, the LEDs 11 face the lateral surface 40 and are disposed linearly along the lateral surface 40. Specifically, the LEDs 11 are disposed in juxtaposition with each other in the x-axis direction. Thus, in the embodiment, the x-axis extends in the direction in which the LEDs 11 are disposed. The x-axis is an exemplary first axis.

The extended portion 41a extends from a first end of the lateral surface 40 (first end in the x-axis direction of the lateral surface 40) in a direction in which the extended portion 41a is spaced away from the extended portion 41b (away from the lateral surface 40) and is away from the LEDs 11. The extended portion 41b extends from a second end of the lateral surface 40 (second end in the x-axis direction of the lateral surface 40) in a direction in which the extended portion 41b is spaced away from the extended portion 41a (away from the lateral surface 40) and is away from the LEDs 11. Specifically, the extended portions 41a and 41b extend from both ends of the lateral surface 40 (both ends in the x-axis direction of the lateral surface 40) in directions in which the extended portions 41a and 41b are spaced away from each other and are away from the LEDs 11. Specifically, a pair of extended portions 41a and 41b spreads out from both ends of the lateral surface 40 in directions in which the extended portions 41a and 41b are spaced away from each other.

From the foregoing, the light guide plate 12 according to the embodiment can be said to have, not a completely rectangular shape in a top view, but a substantially rectangular shape having at least two, out of four corners, cut out on the side on which the LEDs 11 are disposed.

Figure 4:
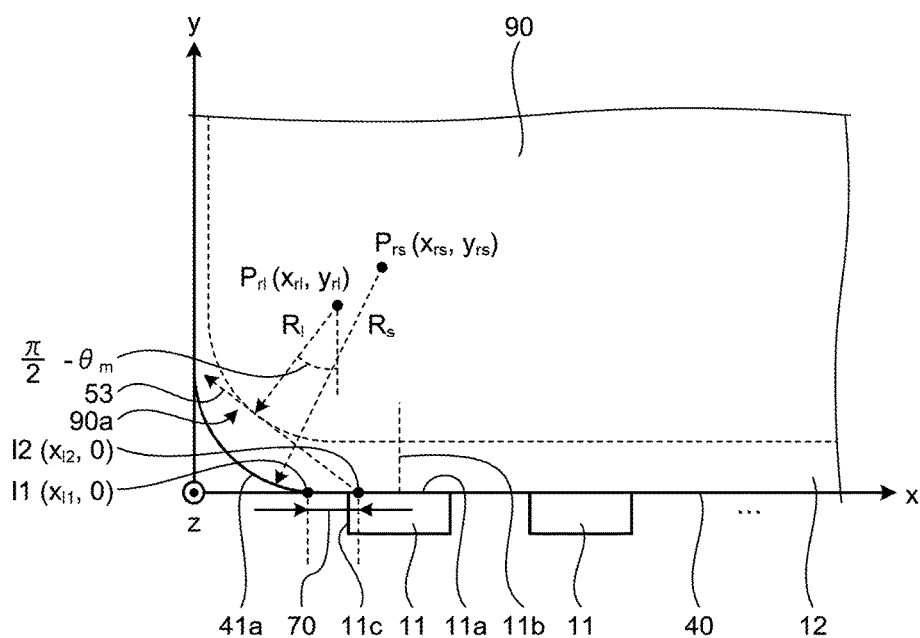
FIG. 4 is a view for illustrating a range of positions in an x-axis direction at which an end portion LED is disposed in the embodiment.

The following describes, with reference to FIG. 4, a range of positions in the x-axis direction at which an LED 11 at an end portion out of the LEDs disposed linearly may be disposed. The following describes the range of positions at which the LED 11 on the side of the extended portion 41a (the leftmost LED 11 in FIG. 3) may be disposed. The principle defining the range of positions at which the LED 11 on the side of the extended portion 41a may be disposed governs the principle by which the range of positions at which the LED 11 (the rightmost LED 11 in FIG. 3) on the side of the extended portion 41b may be disposed is defined.

FIG. 4 is a view for illustrating the range of positions in the x-axis direction at which the LED at the end portion may be disposed. With reference to FIG. 4, the following description assumes that the light emitting surface 11a of the LED 11 on the side of the extended portion 41a (the leftmost LED 11 in FIG. 4 (hereinafter, the end portion LED 11)) contacts the light incident surface 12c and the light emitting surface 11a that emits light has a length in the x-axis direction equal to a length of the end portion LED 11 in the x-axis direction.

Let $x_{led}$ be a position in the x-axis direction (x-coordinate) at which a lateral surface 11c of the end portion LED 11 on the side of the extended portion 41a is disposed. Then, the position of the light emitting surface 11a of the end portion LED 11 closest to the extended portion 41a is given by 10 ($x_{led}$, 0) and the range of $x_{led}$ is given by the following expression (1).

$$x_{l1} \leq x_{led} \leq x_{l2} \quad (1)$$

Where, $x_{l1}$ in expression (1) is given by the following expression (2).

$$x_{l1} = x_{rs} - \sqrt{R_s^2 - y_{rs}^2} \quad (2)$$

Where, $R_s$ in expression (2) denotes a radius of a circle that includes in a circumference thereof an arc formed by the extended portion 41a in an x-y plane that includes an optical axis 11b of the end portion LED 11. It is noted that the x-y plane includes an x-axis and a y-axis that crosses (specifically, that is orthogonal to) the x-axis. The y-axis is an exemplary second axis. Additionally, $x_{rs}$ and $y_{rs}$ in expression (2) denote an x-coordinate and a y-coordinate, respectively, of a coordinate of a center $P_{rs}$ of the circle that includes in the circumference thereof the arc formed by the extended portion 41a in the x-y plane that includes the optical axis 11b of the end portion LED 11. Specifically, $x_{rs}$ represents the position of the center $P_{rs}$ of the circle in the x-axis and $y_{rs}$ represents the position of the center $P_{rs}$ of the circle in the y-axis.

Specifically, a point 11 ($x_{l1}$, 0) illustrated in FIG. 4 indicates the end portion of the lateral surface 40 on the side of the extended portion 41a.

Additionally, $x_{l2}$ in expression (1) is given by the following expression (3).

$$x_{l2} = \frac{y_{c1}}{\tan\left(\frac{\pi}{2} - \theta_m\right)} + x_{c1} \quad (3)$$

Additionally, $x_{c1}$ in expression (3) is given by the following expression (4).

$$x_{c1} = x_{r1} - R_1 \sin\left(\frac{\pi}{2} - \theta_m\right) \quad (4)$$

Where, $R_1$ in expression (4) denotes a radius of a circle that includes in a circumference thereof an arc formed by the corner 90a of the light emitting area 90 in the x-y plane that includes the optical axis 11b of the end portion LED 11. Additionally, $x_{r1}$ in expression (4) denotes an x-coordinate of a coordinate of a center $P_{r1}$ of a circle that includes in a circumference thereof the arc formed by the corner 90a of the light emitting area 90 in the x-y plane that includes the optical axis 11b of the end portion LED 11. Specifically, $x_{r1}$ represents the position in the x-axis of the center $P_{r1}$ of the circle that includes in a circumference thereof the arc formed by the corner 90a of the light emitting area 90.

Additionally, $\theta_m$ in expression (4) is given by the following expression (5).

$$\theta_m = \sin^{-1}\left(\frac{1}{n}\right) \quad (5)$$

Where, n in expression (5) denotes a refractive index of the light guide plate 12. Specifically, $\theta_m$ denotes a critical angle on the assumption that light emitted by the end portion LED 11 is incident on the lateral surface 40 in a direction parallel with the lateral surface 40.

Figure 5:
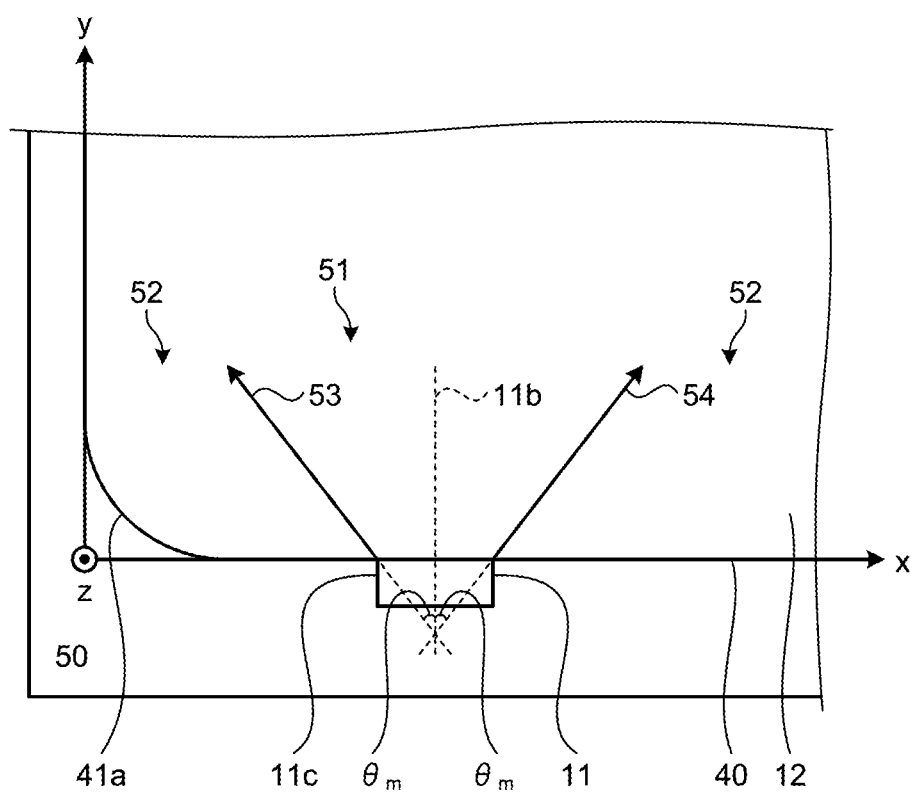
FIG. 5 is a view for illustrating $\theta_m$ in the embodiment.

FIG. 5 is a view for illustrating $\theta_m$ in the embodiment. As illustrated in FIG. 5, $\theta_m$ is an angle formed between the optical axis 11b of the end portion LED 11 and each of boundaries 53 and 54, where the boundaries 53 and 54 are defined as follows. Specifically, in an x-y plane 50 including the optical axis 11b of the end portion LED 11, the boundaries 53 and 54 are established between an emission range 51 over which light that is incident on the lateral surface 40 of the light guide plate 12 travels through the light guide plate 12 and a region different from the emission range 51 (region that is not the emission range 51) 52. It is here noted that the emission range 51 represents a range of the light entering the lateral surface 40 from the end portion LED 11 within the light guide plate 12. Additionally, in FIG. 5, the boundary 53 of the two boundaries 53 and 54 is defined on the side of the extended portion 41a. As described above, the light from the end portion LED 11 incident on the lateral surface 40 travels over the emission range 51. It is, however, noted here that the emission range 51 represents the range through which direct light from the LED 11 travels within the light guide plate 12 and that the emission range 51 does not include a range over which reflected light travels.

Additionally, $y_{c1}$ in expression (3) is given by the following expression (6).

$$y_{c1} = y_{r1} - R_1 \cos\left(\frac{\pi}{2} - \theta_m\right) \quad (6)$$

Where, $y_{r1}$ in expression (6) denotes a y-coordinate of a coordinate of a center $P_{r1}$ of a circle that includes in a circumference thereof the arc formed by the corner 90a of the light emitting area 90 in the x-y plane that includes the optical axis 11b of the end portion LED 11. Specifically, $y_{r1}$ represents the position in the y-axis of the center $P_{r1}$ of the circle that includes in the circumference thereof the arc formed by the corner 90a of the light emitting region 90.

As is known from expressions (3) to (6) given above, a point I2 ($x_{l2}$, 0) illustrated in FIG. 4 assumes a point at which the boundary 53 crosses the lateral surface 40 when the boundary 53 is in contact with the light emitting region 90.

Additionally, as is known from expressions (4) and (6) given above, a point C1 ($x_{c1}$, $y_{c1}$) illustrated in FIG. 4 represents a contact point between the boundary 53 and the light emitting region 90.

From the foregoing discussion, when $x_{led}$ falls within a range given by expression (1), specifically, a range 70 from $x_{l1}$ to $x_{l2}$, both inclusive, which is illustrated in FIG. 4, the end portion LED 11 is to face the lateral surface 40, which is a flat surface. Additionally, when $x_{led}$ falls within the range 70, the light emitting region 90 either contacts the boundary 53 or is disposed on a side opposite to the extended portion 41a with respect to the boundary 53. Thus, the light emitted from the end portion LED 11 is to reliably reach the corner 90a of the light emitting region 90.

FIGS. 6 and 7 respectively describe a planar illumination apparatus 100 according to a first comparative example and a planar illumination apparatus 101 according to a second comparative example. The planar illumination apparatus 10 according to the embodiment will thereafter be compared with the planar illumination apparatuses 100 and 101. FIG. 6 is a top view illustrating a positional relation among a light guide plate, a light emitting area, and an end portion LED in the planar illumination apparatus according to the first comparative example. FIG. 7 is a top view illustrating a positional relation among a light guide plate, a light emitting area, and an end portion LED in the planar illumination apparatus according to the second comparative example.

Reference is made to FIG. 6. In the planar illumination apparatus 100 according to the first comparative example, an end portion LED 11 is disposed to face an extended portion 41a. In this case, a gap 100a of an air layer exists between the end portion LED 11 and the extended portion 41a. The gap 100a is relatively large. Light emitted by the end portion LED 11 travels to expand in a vertical direction (z-axis direction). Thus, a large gap 100a prevents part of the light emitted by the end portion LED 11 from entering the extended portion 41a, so that the extended portion 41a causes the part of the light to travel upwardly and downwardly. The planar illumination apparatus 100 in the first comparative example thus offers unsatisfactory luminous efficiency.

Additionally, a light emitting surface 11a of the end portion LED 11 has a portion at which the light emitting surface 11a contacts the extended portion 41a and a portion at which the gap 100a exists between the light emitting surface 11a and the extended portion 41a. As a result, the level of intensity of light incident on the extended portion 41a from the portion that contacts the extended portion 41a is different from that of light incident on the extended portion 41a from the portion at which the gap 100a exists between the light emitting surface 11a and the extended portion 41a. As such, because the intensity of light entering the extended portion 41a from the end portion LED 11 varies from one portion to another, uneven luminance may occur in light emitted from a corner 90a of a light emitting region 90 that faces the end portion LED 11.

Reference is made to FIG. 7. In the planar illumination apparatus 101 according to the second comparative example, a light guide plate 12 includes an extended portion 41c that represents a chamfered rectangular corner. In the planar illumination apparatus 101 according to the second comparative example, an end portion LED 11 is disposed to face the extended portion 41c. With the configuration in which the end portion LED 11 is disposed at the chamfered extended portion 41c, a distance d between a light emitting surface 11a of the end portion LED 11 and a light emitting region 90 varies depending on a position on the light emitting surface 11a. As a result, levels of susceptibility to leaky light in the light emitting region 90 vary depending on the position on the light emitting surface 11a, so that uneven luminance may occur in light emitted from a corner 90a of the light emitting region 90 that faces the end portion LED 11.

One possible approach toward less noticeable uneven luminance may be to extend the distance d and to thereby make relatively small the difference in intensity of light entering the extended portion 41c among different positions on the light emitting surface 11a. In this case, however, the long distance d increases an outline of the planar illumination apparatus 101, thus making it difficult to achieve what is commonly referred to as a narrower frame.

When the end portion LED 11 is disposed such that the end portion LED 11 contacts a boundary point 41d between the extended portion 41c and a lateral surface 40 and contacts either one of the extended portion 41c and the lateral surface 40, a gap is produced between the surface not in contact with the end portion LED 11 and the end portion LED 11. Thus, unsatisfactory luminous efficiency results. Additionally, a distance between the end portion LED 11 and a light incident surface 12c of the light guide plate 12 varies depending on the position on the light emitting surface 11a. Thus, uneven luminance may occur in the light emitted from the corner 90a of the light emitting region 90 that faces the end portion LED 11.

The foregoing reveals that, preferably, the end portion LED 11 is not to be disposed at the extended portion 41a or 41c from viewpoints of improved luminous efficiency and prevention of uneven luminance.

Thus, in the planar illumination apparatus 10 according to the embodiment, the end portion LED 11 is disposed to face the lateral surface 40. Specifically, all of the LEDs 11 are disposed to face the lateral surface 40 alone. This configuration results in the distance between the light emitting surface 11a and the lateral surface 40 being substantially identical in each of all LEDs 11 regardless of the position on the light emitting surface 11a.

In addition, in the planar illumination apparatus 10 according to the embodiment, the light emitting region 90 extends over the side of the extended portion 41a or 41b beyond the end portion LED 11 (lateral surface 40) in the direction (x-axis direction) in which the LEDs 11 are disposed. Specifically, the light emitting region 90 extends onto the sides of the extended portions 41a and 41b beyond the flat lateral surface 40 in the direction in which the flat lateral surface 40 extends (x-axis direction). Even with the light emitting region 90 extending onto the sides of the extended portions 41a and 41b, however, the light from the end portion LED 11 reliably reaches the extended regions.

To elaborate on the foregoing description using a specific example, in the planar illumination apparatus 10 according to the embodiment, the light emitting region 90 contacts the boundary 53 or the light emitting region 90 is disposed on a side opposite to the extended portion 41a with respect to the boundary 53. Thus, the light emitted by the end portion LED 11 reliably reaches the corner 90a of the light emitting region 90.

The foregoing has described the planar illumination apparatus 10 according to the embodiment. From the foregoing description, the planar illumination apparatus 10 in the embodiment can improve luminous efficiency and prevent uneven luminance from occurring.

First Modification of Embodiment

The above embodiment has been described for a case in which the corner 90a is rounded and the corner 90a has a curved outline in the x-y plane. The light guide plate 12 may nonetheless have a rectangular shape having chamfered corners. The following describes a first modification of the embodiment featuring the light guide plate having chamfered corners.

Figure 8:
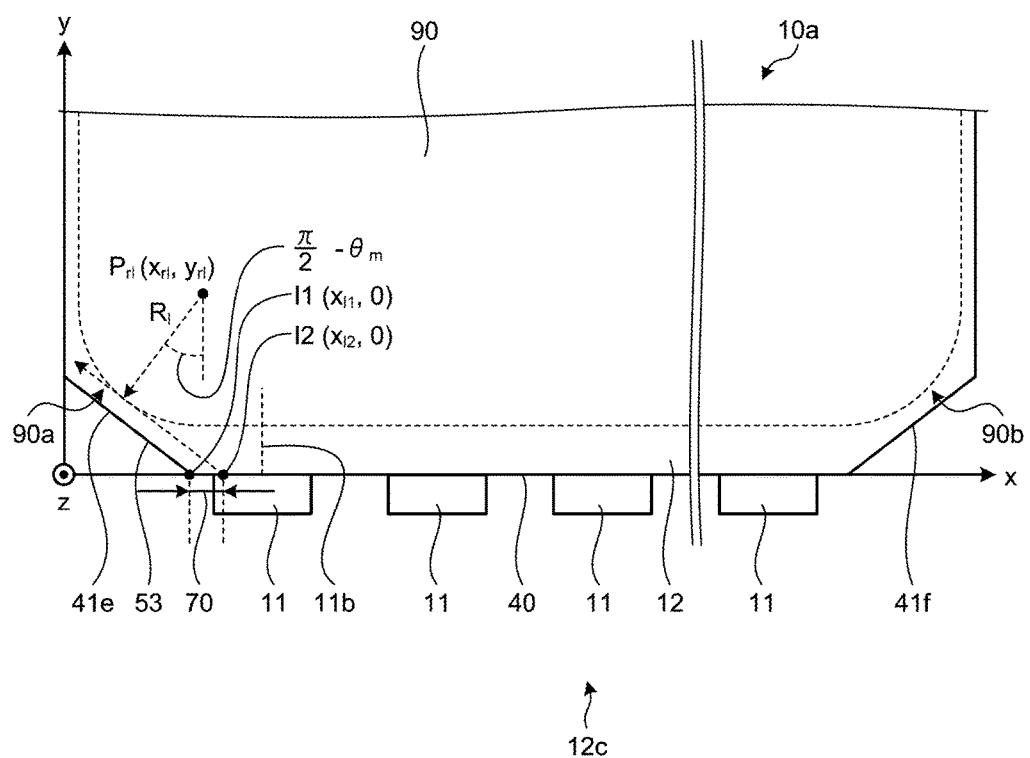
FIG. 8 is a top view illustrating a positional relation among a light guide plate, a light emitting area, and an end portion LED in a planar illumination apparatus according to a first modification of the embodiment.

FIG. 8 is a top view illustrating a positional relation among a light guide plate, a light emitting area, and an end portion LED in a planar illumination apparatus according to the first modification of the embodiment. As illustrated in the example of FIG. 8, this planar illumination apparatus 10a according to the first modification of the embodiment includes a light guide plate 12 that includes a flat extended portion 41e having a corner corresponding to a corner 90a of a light emitting region 90 chamfered.

Additionally, the light guide plate 12 includes a flat extended portion 41f having a corner corresponding to a corner 90b of the light emitting region 90 chamfered as with the extended portion 41e described above.

The extended portion 41e extends from a first end of a lateral surface 40 (first end in the x-axis direction of the lateral surface 40) in a direction in which the extended portion 41e is spaced away from the extended portion 41f (and away from the lateral surface 40) and is away from the LEDs 11. The extended portion 41f extends from a second end of the lateral surface 40 (second end in the x-axis direction of the lateral surface 40) in a direction in which the extended portion 41f is spaced away from the extended portion 41e (and away from the lateral surface 40) and is away from the LEDs 11. Specifically, the extended portions 41e and 41f extend from respective ends of the lateral surface 40 (both ends in the x-axis direction of the lateral surface 40) in directions in which the extended portions 41e and 41f are spaced away from each other and are away from the LEDs 11.

In the planar illumination apparatus 10a according to the first modification of the embodiment, $x_{led}$ falls within a range by the above-described expression (1), specifically, a range 70 from $x_{l1}$ to $x_{l2}$, both inclusive, illustrated in FIG. 8, as with the above-described planar illumination apparatus 10 according to the embodiment.

$x_{l2}$ according to the first modification of the embodiment is similar to $x_{l2}$ according to the above-described embodiment. Meanwhile, $x_{l1}$ according to the first modification of the embodiment is an x-coordinate of an intersection point l1 between a straight line formed by the extended portion 41e in an x-y plane that includes an optical axis 11b of an end portion LED 11 and the lateral surface 40.

The foregoing has described a range of positions in the x-axis direction at which the LED 11 on the side of the extended portion 41e may be disposed. The same principle as that for defining the range of positions at which the LED 11 on the side of the extended portion 41e is disposed enables the range of positions at which the LED 11 on the side of the extended portion 41f is disposed to be defined.

When $x_{led}$ falls within the range 70 from $x_{l1}$ to $x_{l2}$, both inclusive, illustrated in FIG. 8, the end portion LED 11 is to face the lateral surface 40, which is a flat surface. Additionally, when $x_{led}$ falls within the range 70, the light emitting region 90 either contacts a boundary 53 or is disposed on a side opposite to the extended portion 41e with respect to the boundary 53. Thus, light emitted from the end portion LED 11 on the extended portion 41e side is to reliably reach the corner 90a of the light emitting region 90. Similarly, light emitted from the end portion LED 11 on the extended portion 41f side is to reliably reach the corner 90b of the light emitting region 90.

The foregoing has described the planar illumination apparatus 10a according to the first modification of the embodiment. From the foregoing description, the planar illumination apparatus 10a according to the first modification of the embodiment can improve luminous efficiency and prevent uneven luminance from occurring in a manner similar to the planar illumination apparatus 10 according to the embodiment described above.

Second Modification of Embodiment

The first modification of the embodiment has been described for a case in which the LEDs 11 contact the light guide plate 12. The LEDs 11 may be spaced away from the light guide plate 12. The following describes a second modification of the embodiment featuring the LEDs spaced away from the light guide plate.

Figure 9:
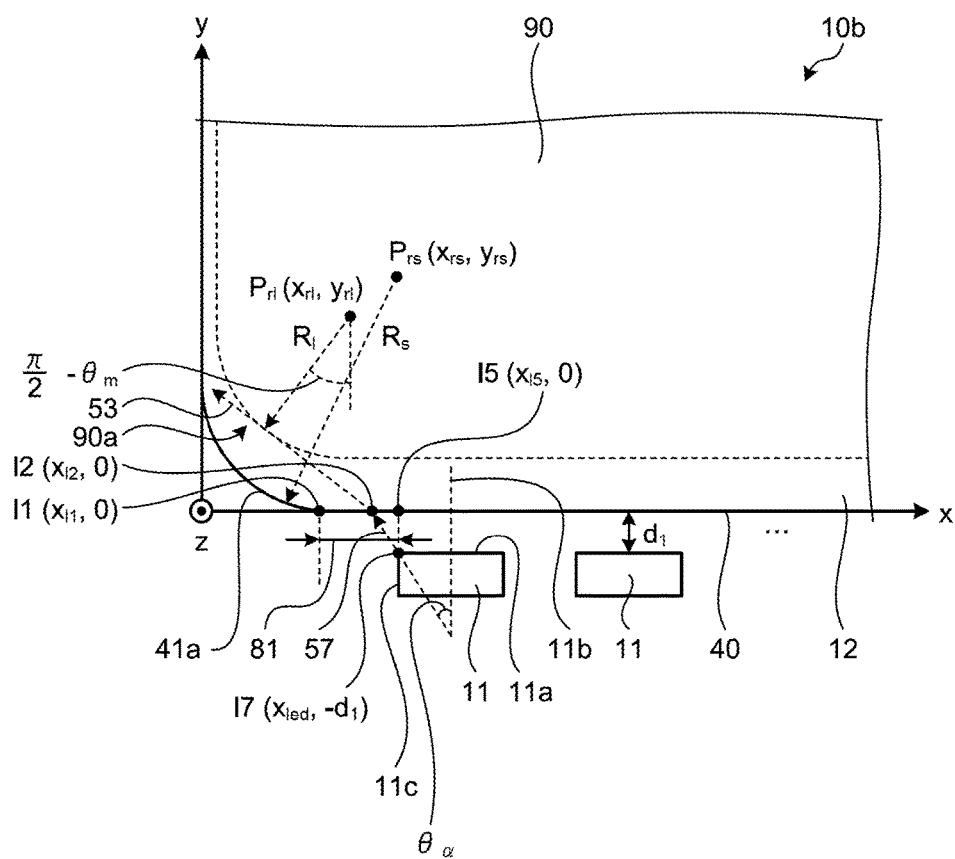
FIG. 9 is a top view illustrating a positional relation among a light guide plate, a light emitting area, and an end portion LED in a planar illumination apparatus according to a second modification of the embodiment.

FIG. 9 is a top view illustrating a positional relation among a light guide plate, a light emitting area, and an end portion LED in a planar illumination apparatus according to the second modification of the embodiment. As illustrated in FIG. 9, this planar illumination apparatus 10b according to the second modification of the embodiment differs from the planar illumination apparatus 10 according to the above-described embodiment in that all LEDs 11 are spaced a distance $d_1$ away from a lateral surface 40. Specifically, as illustrated in FIG. 9, the position of a light emitting surface 11a of an end portion LED 11 closest to an extended portion 41a is represented by l7 ($x_{led}$, $-d_1$).

Figure 10:
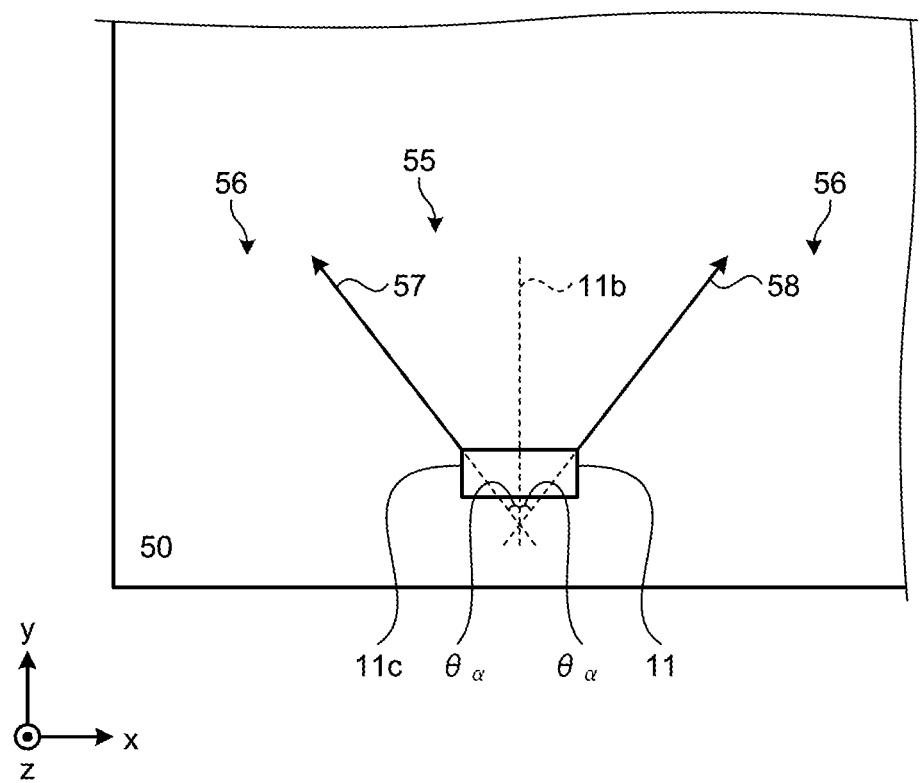
FIG. 10 is a view for illustrating an emission range established when light emitted by the end portion LED in the second modification reaches the light guide plate.

FIG. 10 is a view for illustrating an emission range established when light emitted by the end portion LED in the second modification reaches the light guide plate. In the second modification, an emission range 55 is defined as a range over which light that is emitted by the end portion LED 11 and has intensity equal to or greater than a predetermined value travels. For example, as illustrated in FIG. 10, $\theta_\alpha$ is an angle formed between an optical axis 11b of the end portion LED 11 and each of boundaries 57 and 58, where the boundaries 57 and 58 are defined as follows. Specifically, in an x-y plane 50 including the optical axis 11b of the end portion LED 11, the boundaries 57 and 58 are established between the emission range 55 over which light that is emitted from the LED 11 and a region 56 different from the emission range 55 (region that is not the emission range 55). As such, $\theta_\alpha$ is an angle formed between the optical axis 11b of the end portion LED 11 and each of the boundaries 57 and 58. Specifically, the light that is emitted by the end portion LED 11 and has intensity equal to or greater than a predetermined value travels to expand over the angle $\theta_\alpha$ with respect to the optical axis 11b before reaching the light guide plate 12. It is here noted that, in FIG. 10, the boundary 57 out of the two boundaries 57 and 58 is on the side of the extended portion 41a. The angle $\theta_\alpha$ in terms of a half width (half-value angle) is typically 60°.

The second modification differs from the embodiment and the above-described first modification in that $x_{led}$ falls, not within the range given by the above-described expression (1), but within a range given by the following expression (7).

$$x_{l1} \leq x_{led} \leq x_{l5} \quad (7)$$

Where, $x_{l5}$ in expression (7) is given by the following expression (8).

$$x_{l5} = x_{l2} + d_1 \tan \theta_\alpha \quad (8)$$

In addition, the second modification differs from the embodiment and the above-described first modification in that $\theta_m$ falls, not within the range given by the above-described expression (5), but within a range given by the following expression (9).

$$\theta_m = \sin^{-1}\left(\frac{\sin\theta_\alpha}{n}\right) \quad (9)$$

When $x_{led}$ falls within a range 81 from $x_{l1}$ to $x_{l5}$, both inclusive, illustrated in FIG. 9, the end portion LED 11 is to face the lateral surface 40, which is a flat surface. Additionally, when $x_{led}$ falls within the range 81, the light emitting region 90 either contacts a boundary 53 or is disposed on a side opposite to the extended portion 41e with respect to the boundary 53. Thus, light emitted from the end portion LED 11 on the extended portion 41e side is to reliably reach a corner 90a of the light emitting region 90. Similarly, light emitted from the end portion LED 11 on the extended portion 41f side is to reliably reach the corner 90b (see FIG. 3) of the light emitting region 90.

The foregoing has described the planar illumination apparatus 10b according to the second modification of the embodiment. From the foregoing description, the planar illumination apparatus 10b according to the second modification of the embodiment can improve luminous efficiency and prevent uneven luminance from occurring in a manner similar to the planar illumination apparatus 10 according to the embodiment and the planar illumination apparatus 10a according to the first modification described above.

Additionally, the embodiment and the various modifications of the embodiment have been described such that no light incident prism is formed on the lateral surface 40 of the light guide plate 12. A light incident prism may nonetheless be formed in the lateral surface 40. In this case, the above-mentioned $\theta_m$ is obtained by optical simulation.

While a certain embodiment including modifications thereof have been described, the embodiment and modifications have been presented by way of example only and are not intended to limit the scope of the invention. Accordingly, the present invention embraces all possible configurations that combine appropriately the various elements described above. Further effects and modifications can be easily derived by those skilled in the art. Therefore, a wider aspect of the present invention is not limited by the specific details and the representative embodiments represented and described above.

In one embodiment, uneven luminance can be prevented from occurring.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus, comprising:
    a plurality of light sources disposed linearly, the light sources emitting light; and
    a light guide plate having
        a lateral surface on which the light sources are disposed so as to face the lateral surface and
        extended portions extending in directions in which the extended portions are spaced away from each other from both ends of the lateral surface and are away from the light sources, wherein:
    the light guide plate has a light emitting region that is either in contact with a boundary or disposed on a side opposite to one of the extended portions with respect to the boundary, the boundary being established between an emission range of an end portion light source on a side adjacent to the extended portion and a region different from the emission range,
    end portions of the light emitting region on the side of the boundary have a substantially rounded shape,
    the light emitting region extends over sides of the extended portions beyond the end portion light source in a direction in which the light sources are disposed, and
    an end side of the light emitting region on the side of a light incident surface is disposed between a pair of the extended portions.

2. The planar illumination apparatus according to claim 1, wherein the light emitting region is either in contact with the boundary or disposed on the side opposite to the extended portion with respect to the boundary, the boundary being established between the emission range in the light guide plate of light that is incident on the lateral surface from the end portion light source and a region different from the emission range.

3. The planar illumination apparatus according to claim 1, wherein the lateral surface includes a light incident prism.

4. The planar illumination apparatus according to claim 1, wherein a position $x_{led}$ of the end portion light source in a first axis that extends in a direction in which the light sources are disposed falls within a range given by expression (1):

$$x_{l1} \leq x_{led} \leq x_{l2} \tag{1}$$

where, $x_{l1}$ in expression (1) is given by expression (2):

$$x_{l1} = x_{rs} - \sqrt{R_s^2 - y_{rs}^2} \tag{2}$$

where, $R_s$ in expression (2) denotes a radius of a circle that includes in a circumference thereof an arc formed by the extended portion in a plane that includes an optical axis of the end portion light source, the plane including the first axis and a second axis that crosses the first axis; $x_{rs}$ in expression (2) denotes a position of the center of the circle in the first axis; and $y_{rs}$ in expression (2) denotes a position of the center of the circle in the second axis, and wherein Additionally, $x_{l2}$ in expression (1) is given by expression (3):

$$x_{l2} = \frac{y_{c1}}{\tan\left(\frac{\pi}{2} - \theta_m\right)} + x_{c1} \tag{3}$$

where, $x_{c1}$ in expression (3) is given by expression (4):

$$x_{c1} = x_{r1} - R_1 \sin\left(\frac{\pi}{2} - \theta_m\right) \tag{4}$$

where, $R_1$ in expression (4) denotes a radius of a circle that includes in a circumference thereof an arc formed by a corner of the light emitting region in the plane; $x_{r1}$ in expression (4) denotes a position in the first axis of a center of the circle that includes in the circumference thereof the arc formed by the corner of the light emitting region; and $\theta_m$ in expression (4) is given by expression (5):

$$\theta_m = \sin^{-1}\left(\frac{1}{n}\right) \tag{5}$$

where, n in expression (5) denotes a refractive index of the light guide plate, and wherein Additionally, $y_{c1}$ in expression (3) is given by expression (6):

$$y_{c1} = y_{r1} - R_1 \cos\left(\frac{\pi}{2} - \theta_m\right) \tag{6}$$

where, $y_{r1}$ in expression (6) denotes a position in the second axis of the center of the circle that includes in the circumference thereof the arc formed by the corner of the light emitting region.

5. The planar illumination apparatus according to claim 1, wherein a position $x_{led}$ of the end portion light source in a first axis that extends in a direction in which the light sources are disposed falls within a range given by expression (7):

$$x_{l1} \leq x_{led} \leq x_{l5} \tag{7}$$

where, $x_{l1}$ in expression (7) is given by expression (8):

$$x_{l1} = x_{rs} - \sqrt{R_s^2 - y_{rs}^2} \tag{8}$$

where, $R_s$ in expression (8) denotes a radius of a circle that includes in a circumference thereof an arc formed by the extended portion in a plane that includes an optical axis of the end portion light source, the plane including the first axis and a second axis that crosses the first axis; $x_{rs}$ in expression (8) denotes a position of the center of the circle in the first axis; and $y_{rs}$ in expression (8) denotes a position of the center of the circle in the second axis, and wherein Additionally, $x_{l5}$ in expression (7) is given by expression (9):

$$x_{l5} = x_{l2} + d_1 \tan \theta_\alpha \tag{9}$$

where, $d_1$ in expression (9) denotes a distance between the end portion light source and the lateral surface of the light guide plate; $\theta_\alpha$ in expression (9) is an angle formed between the optical axis and the boundary; and $x_{l2}$ in expression (9) is given by expression (10):

$$x_{l2} = \frac{y_{c1}}{\tan\left(\frac{\pi}{2} - \theta_m\right)} + x_{c1} \tag{10}$$

where, $x_{c1}$ in expression (10) is given by expression (11):

$$x_{c1} = x_{r1} - R_1 \sin\left(\frac{\pi}{2} - \theta_m\right) \tag{11}$$

where, $R_1$ in expression (11) denotes a radius of a circle that includes in a circumference thereof an arc formed by a corner of the light emitting region in the plane; $x_{r1}$ in expression (11) denotes a position in the first axis of a center of the circle that includes in the circumference thereof the arc formed by the corner of the light emitting region; and $\theta_m$ in expression (11) is given by expression (12):

$$\theta_m = \sin^{-1}\left(\frac{\sin\theta_\alpha}{n}\right) \tag{12}$$

where, n in expression (12) denotes a refractive index of the light guide plate, and wherein Additionally, $y_{c1}$ in expression (10) is given by expression (13):

$$y_{c1} = y_{r1} - R_1 \cos\left(\frac{\pi}{2} - \theta_m\right) \tag{13}$$

where, $y_{r1}$ in expression (13) denotes a position in the second axis of the center of the circle that includes in the circumference thereof the arc formed by the corner of the light emitting region.

6. A planar illumination apparatus, comprising:
a plurality of light sources that emit light; and
a light guide plate having
an end face on which light emitted by the light sources is incident and
a light emitting region that emits light entering from the end face, wherein:

the end face has a flat lateral surface and a pair of extended portions that spread out from both ends of the lateral surface in directions in which the extended portions are spaced away from each other, end portions of the light emitting region on the side of a light incident surface have a substantially rounded shape, the light emitting region extends over sides of the extended portions beyond the flat lateral surface in a direction in which the flat lateral surface extends, an end side of the light emitting region on the side of the light incident surface is disposed between a pair of the extended portions, and the light sources are disposed so as to face the flat lateral surface alone.

7. The planar illumination apparatus according to claim 6, wherein the lateral surface includes a light incident prism.

8. The planar illumination apparatus according to claim 6, wherein a position $x_{led}$ of the end portion light source in a first axis that extends in a direction in which the light sources are disposed falls within a range given by expression (14):

$$x_{l1} \leq x_{led} \leq x_{l2} \tag{14}$$

where, $x_{l1}$ in expression (14) is given by expression (15):

$$x_{l1} = x_{rs} - \sqrt{R_s^2 - y_{rs}^2} \tag{15}$$

where, $R_s$ in expression (15) denotes a radius of a circle that includes in a circumference thereof an arc formed by the extended portion in a plane that includes an optical axis of the end portion light source, the plane including the first axis and a second axis that crosses the first axis; $x_{rs}$ in expression (15) denotes a position of the center of the circle in the first axis; and $y_{rs}$ in expression (15) denotes a position of the center of the circle in the second axis, and wherein Additionally, $x_{l2}$ in expression (14) is given by expression (16):

$$x_{l2} = \frac{y_{c1}}{\tan\left(\frac{\pi}{2} - \theta_m\right)} + x_{c1} \tag{16}$$

where, $x_{c1}$ in expression (16) is given by expression (17):

$$x_{c1} = x_{r1} - R_1 \sin\left(\frac{\pi}{2} - \theta_m\right) \tag{17}$$

where, $R_l$ in expression (17) denotes a radius of a circle that includes in a circumference thereof an arc formed by a corner of the light emitting region in the plane; $x_{r1}$ in expression (17) denotes a position in the first axis of a center of the circle that includes in the circumference thereof the arc formed by the corner of the light emitting region; and $\theta_m$ in expression (17) is given by expression (18):

$$\theta_m = \sin^{-1}\left(\frac{1}{n}\right) \tag{18}$$

where, n in expression (18) denotes a refractive index of the light guide plate, and wherein Additionally, $y_{c1}$ in expression (16) is given by expression (19):

$$y_{c1} = y_{r1} - R_1 \cos\left(\frac{\pi}{2} - \theta_m\right) \tag{19}$$

where, $y_{r1}$ in expression (19) denotes a position in the second axis of the center of the circle that includes in the circumference thereof the arc formed by the corner of the light emitting region.

9. The planar illumination apparatus according to claim 6, wherein a position $x_{led}$ of the end portion light source in a first axis that extends in a direction in which the light sources are disposed falls within a range given by expression (20):

$$x_{l1} \leq x_{led} \leq x_{l5} \tag{20}$$

where, $x_{l1}$ in expression (20) is given by expression (21):

$$x_{l1} = x_{rs} - \sqrt{R_s^2 - y_{rs}^2} \tag{21}$$

where, $R_s$ in expression (21) denotes a radius of a circle that includes in a circumference thereof an arc formed by the extended portion in a plane that includes an optical axis of the end portion light source, the plane including the first axis and a second axis that crosses the first axis; $x_{rs}$ in expression (21) denotes a position of the center of the circle in the first axis; and $y_{rs}$ in expression (21) denotes a position of the center of the circle in the second axis, and wherein Additionally, $x_{l5}$ in expression (20) is given by expression (22):

$$x_{l5} = x_{l2} + d_1 \tan \theta_\alpha \tag{22}$$

where, $d_1$ in expression (22) denotes a distance between the end portion light source and the lateral surface of the light guide plate; $\theta_\alpha$ in expression (22) is an angle formed between the optical axis and the boundary; and $x_{l2}$ in expression (22) is given by expression (23):

$$x_{l2} = \frac{y_{c1}}{\tan\left(\frac{\pi}{2} - \theta_m\right)} + x_{c1} \tag{23}$$

where, $x_{c1}$ in expression (23) is given by expression (24):

$$x_{c1} = x_{r1} - R_1 \sin\left(\frac{\pi}{2} - \theta_m\right) \tag{24}$$

where, $R_1$ in expression (24) denotes a radius of a circle that includes in a circumference thereof an arc formed by a corner of the light emitting region in the plane; $x_{r1}$ in expression (24) denotes a position in the first axis of a center of the circle that includes in the circumference thereof the arc formed by the corner of the light emitting region; and $\theta_m$ in expression (24) is given by expression (25):

$$\theta_m = \sin^{-1}\left(\frac{\sin\theta_\alpha}{n}\right) \tag{25}$$

where, n in expression (25) denotes a refractive index of the light guide plate, and wherein Additionally, $y_{c1}$ in expression (23) is given by expression (26):

$$y_{c1} = y_{r1} - R_1 \cos\left(\frac{\pi}{2} - \theta_m\right) \quad (26)$$

where, $y_{r1}$ in expression (26) denotes a position in the second axis of the center of the circle that includes in the circumference thereof the arc formed by the corner of the light emitting region.

\* \* \* \* \*